United States Patent
McIntyre et al.

(10) Patent No.: US 11,166,232 B1
(45) Date of Patent: Nov. 2, 2021

(54) REDUCING MOBILE DEVICE POWER CONSUMPTION THROUGH PREDICTIVE SPEED-BASED GEOFENCE LOCATION TRACKING

(71) Applicant: Intuit Inc., Mountain View, CA (US)

(72) Inventors: Nathan A. McIntyre, Eagle, ID (US); Jared Isaac Guttromson, Eagle, ID (US); Devin Shively, Eagle, ID (US); Joshua Andrew Yundt, Eagle, ID (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/029,328

(22) Filed: Sep. 23, 2020

(51) Int. Cl.
*H04W 52/02* (2009.01)
*H04W 4/02* (2018.01)
*H04W 4/029* (2018.01)
*H04W 4/021* (2018.01)

(52) U.S. Cl.
CPC ....... *H04W 52/0212* (2013.01); *H04W 4/021* (2013.01); *H04W 4/027* (2013.01); *H04W 4/029* (2018.02); *H04W 52/0209* (2013.01)

(58) Field of Classification Search
CPC . H04W 52/0209; H04W 4/021; H04W 4/022; H04W 4/027; H04W 4/02; H04W 4/023; H04W 4/029; H04W 4/20; H04W 4/50; H04W 52/0251; H04W 64/00; G01S 19/14; G01S 19/34; G01S 19/42; G01S 19/52; G01S 5/02; G01S 5/19; G01S 5/01; H04M 1/72454; H04M 1/72457; H04M 2250/12; G06Q 30/0261; H04L 29/08657
See application file for complete search history.

(56) References Cited

U.S. PATENT DOCUMENTS

| | | | |
|---|---|---|---|
| 9,215,560 B1 * | 12/2015 | Jernigan | H04W 4/021 |
| 10,067,237 B1 * | 9/2018 | Liu | G01S 19/52 |
| 2011/0306304 A1 * | 12/2011 | Forutanpour | H04W 4/021 |
| | | | 455/67.11 |
| 2013/0217411 A1 * | 8/2013 | Croy | G06Q 30/0267 |
| | | | 455/456.1 |

(Continued)

FOREIGN PATENT DOCUMENTS

| | | | | |
|---|---|---|---|---|
| WO | WO-2015196362 A1 * | 12/2015 | | H04W 4/027 |
| WO | WO-2016028579 A1 * | 2/2016 | | H04W 12/06 |

*Primary Examiner* — Matthew C Sams
(74) *Attorney, Agent, or Firm* — Ferguson Braswell Fraser Kubasta PC

(57) ABSTRACT

A method including receiving, at a mobile device, a request to provision a first geofence. Geolocation hardware on the mobile device determines a current position of the mobile device. Roads are identified within a predetermined number of turns of the current position. Corresponding speed limits applicable to the roads within the predetermined number of turns are retrieved. A predicted average speed of the mobile device is determined by averaging the corresponding speed limits A predictive geofence radius is determined based on the predicted average speed. A first predictive geofence having the predictive geofence radius is provisioned. The first predictive geofence has a third predicted duration before a second predictive geofence is provisioned by the mobile device. Provisioning the first predictive geofence and the second predictive geofence together consume less power than provisioning geofences without prediction.

18 Claims, 4 Drawing Sheets

(56) References Cited

U.S. PATENT DOCUMENTS

| | | | |
|---|---|---|---|
| 2013/0295969 A1* | 11/2013 | Sheshadri | G01S 19/34 |
| | | | 455/456.6 |
| 2013/0297175 A1* | 11/2013 | Davidson | G08G 1/202 |
| | | | 701/99 |
| 2014/0370909 A1* | 12/2014 | Natucci, Jr. | H04W 52/0225 |
| | | | 455/456.1 |
| 2014/0370911 A1* | 12/2014 | Gorgenyi | H04W 52/0251 |
| | | | 455/456.1 |
| 2015/0141037 A1* | 5/2015 | Saha | G01S 19/34 |
| | | | 455/456.1 |
| 2016/0057572 A1* | 2/2016 | Bojorquez Alfaro | |
| | | | H04W 12/02 |
| | | | 455/411 |
| 2016/0066141 A1* | 3/2016 | Jain | H04W 4/021 |
| | | | 455/456.1 |
| 2016/0094944 A1* | 3/2016 | Kong | H04W 4/022 |
| | | | 455/456.1 |
| 2017/0034656 A1* | 2/2017 | Wang | H04W 4/023 |

* cited by examiner

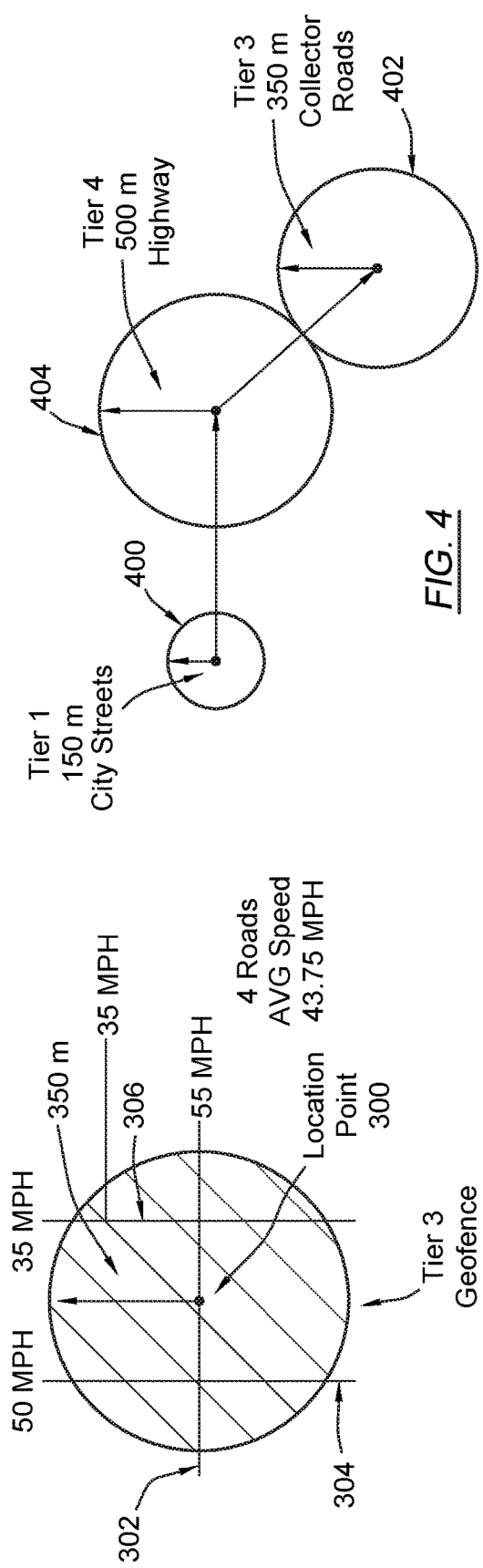
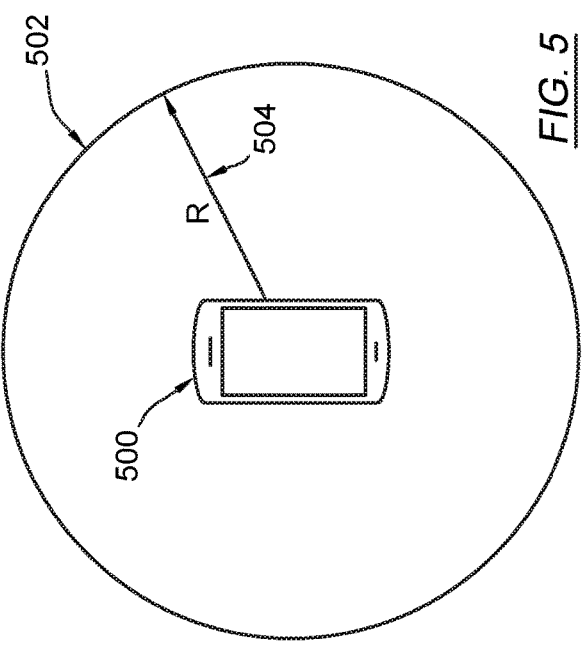
FIG. 4
FIG. 5
FIG. 3

REDUCING MOBILE DEVICE POWER CONSUMPTION THROUGH PREDICTIVE SPEED-BASED GEOFENCE LOCATION TRACKING

BACKGROUND

Mobile devices often operate using battery power. Modern mobile devices have many functions which, if not regulated, may quickly drain the power in the battery. Thus, techniques for reducing the power draw on the battery of a mobile device are important.

SUMMARY

The one or more embodiments provide for a method. The method includes receiving, at a mobile device, a request to provision a first geofence. The first geofence has a first predicted duration before a second predicted geofence is provisioned by the mobile device. Provisioning the first geofence and the second predicted geofence together consume a first amount of power from a battery of the mobile device. The method also includes using geolocation hardware on the mobile device to determine a current position of the mobile device. The method also includes identifying, by the mobile device, roads within a predetermined number of turns of the current position of the mobile device. The method also includes retrieving, by the mobile device, corresponding speed limits applicable to the roads within the predetermined number of turns. The method also includes determining, by the mobile device, a predicted average speed of the mobile device by averaging the corresponding speed limits. The method also includes determining, by the mobile device, a predictive geofence radius based on the predicted average speed. The method also includes provisioning, by the mobile device, a first predictive geofence having the predictive geofence radius. The first predictive geofence has a third predicted duration before a second predictive geofence is provisioned by the mobile device. Provisioning the first predictive geofence and the second predictive geofence together consume a second amount of power from the battery of the mobile device, the second amount of power less than the first amount of power.

The one or more embodiments also provide for a system. The system includes a mobile device including a processor, communications hardware, geolocation hardware, a battery, and a data repository. The data repository also stores a request to provision a first geofence. The first geofence has a first predicted duration before a second predicted geofence is provisioned by the mobile device. Provisioning the first geofence and the second predicted geofence together consume a first amount of power from a battery of the mobile device a current position of the mobile device. The data repository also stores roads within a predetermined number of turns of the current position of the mobile device. The data repository also stores corresponding speed limits applicable to the roads within the predetermined number of turns. The data repository also stores a predicted average speed of the mobile device. The data repository also stores a first predictive geofence having a predictive geofence radius. The system also includes a geolocation application loaded on the mobile device configured to identify the current position of the mobile device using the geolocation hardware. The system also includes a map application loaded on the mobile device configured to identify the roads and the corresponding speed limits. The system also includes a geofence provisioning application configured to save current drawn from the battery to power the geolocation hardware by being programmed to, responsive to receiving the request to provision the first geofence, determine the predicted average speed by averaging the corresponding speed limits. The geofence provisioning application is also configured to determine the predictive geofence radius based on the predicted average speed. The geofence provisioning application is also configured to provision the first predictive geofence with the predictive geofence radius on the mobile device. The first predictive geofence has a third predicted duration before a second predictive geofence is provisioned by the mobile device. The geofence provisioning application is also configured to provision the first predictive geofence and the second predictive geofence together consume a second amount of power from the battery of the mobile device, the second amount of power less than the first amount of power.

The one or more embodiments also provide for another method. The method also includes receiving, at a server, a request to provision a first geofence for a mobile device. The first geofence has a first predicted duration before a second predicted geofence is provisioned for the mobile device. Provisioning the first geofence and the second predicted geofence together consume a first amount of power from a battery of the mobile device. The method also includes receiving, at the server and from geolocation hardware on the mobile device, a determination of a current position of the mobile device. The method also includes identifying, by the server, roads within a predetermined number of turns of the current position of the mobile device. The method also includes retrieving, by the server, corresponding speed limits applicable to the roads within the predetermined number of turns. The method also includes determining, by the server, a predicted average speed of the mobile device by averaging the corresponding speed limits. The method also includes determining, by the server, a predictive geofence radius based on the predicted average speed. The method also includes transmitting, by the server to the mobile device, a first predictive geofence having the predictive geofence radius. The first predictive geofence has a third predicted duration before a second predictive geofence is provisioned by the mobile device. Provisioning the first predictive geofence and the second predictive geofence together consume a second amount of power from the battery of the mobile device, the second amount of power less than the first amount of power.

Other aspects of the invention will be apparent from the following description and the appended claims.

BRIEF DESCRIPTION OF DRAWINGS

FIG. 3, FIG. 4, and FIG. 5 show a specific example of a geofence and the provisioning of a geofence, in accordance with one or more embodiments of the invention.

DETAILED DESCRIPTION

Figure 1:
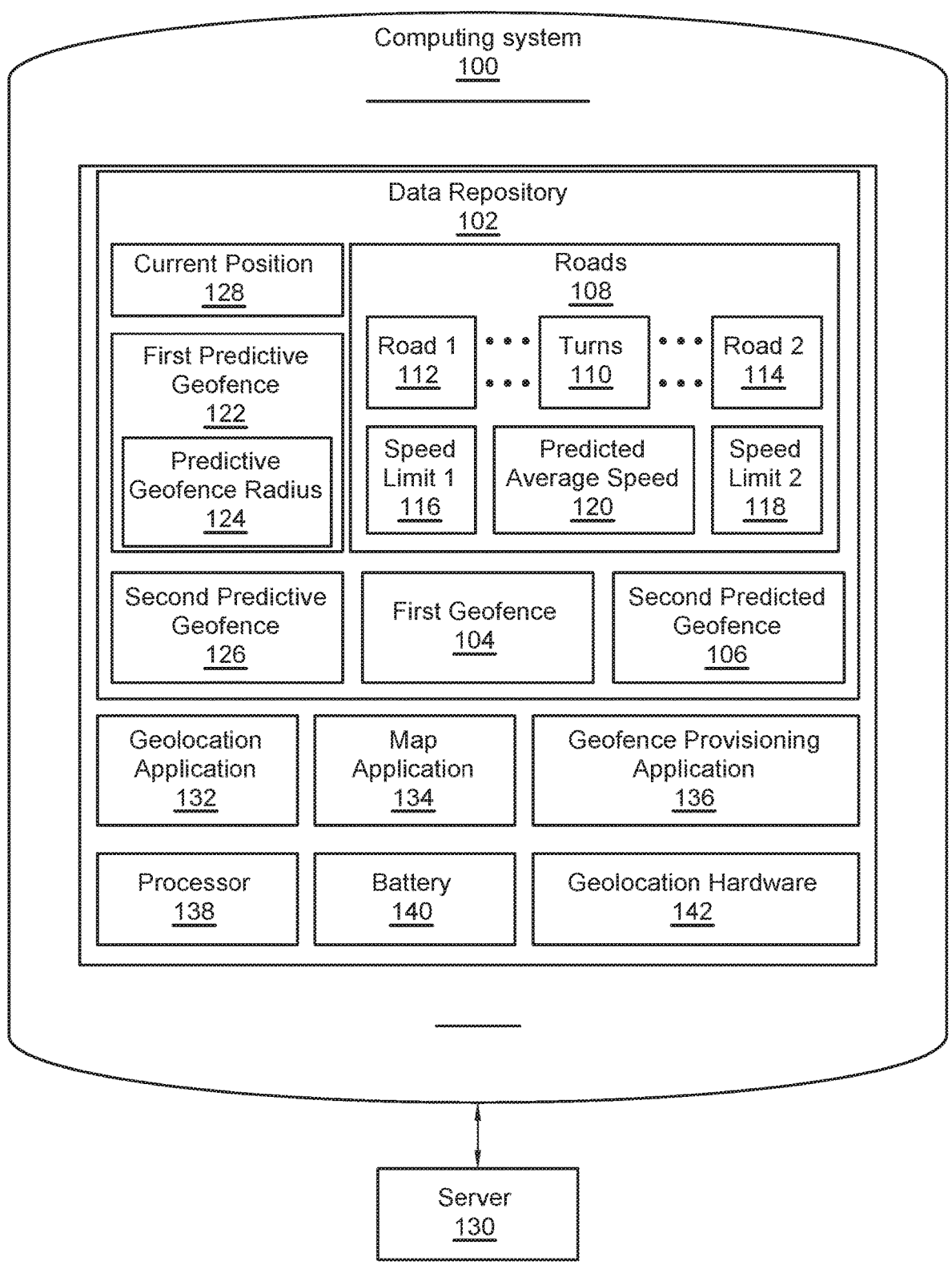
FIG. 1 shows a computing system, in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to an improved technique for provisioning a geofence in relative to an electronic device that is in motion (i.e., a mobile electronic device). As used herein, a geofence is defined as a virtual perimeter for a real-world geographic area. Technical problems may arise when provisioning a geofence for a mobile electronic device. For example, if the electronic device is moving fast enough, the electronic device may leave the boundary of the geofence before the geofence is provisioned on the electronic device. In another example, the electronic device may leave the boundary of the geofence prematurely relative to some intended activity intended to be measured with respect to the electronic device's location relative to the geofence. In particular, for example, financial management software may use a geofence provisioned on an employee's mobile phone to track a location of the employee for billing purposes, but if the mobile phone leaves the geofence perimeter prematurely, then insufficient data or no data of a desired type may be gathered. Thus, provisioning a "proper" geofence is technically difficult for electronic devices that are in motion. A "proper" geofence is a geofence that is large enough to prevent premature exit of the electronic device from the geofence, but small enough to accomplish the intended purpose for provisioning the geofence.

Another technical problem that arises is the power drain on a battery of an electronic device caused by provisioning a geofence. Provisioning a geofence on a mobile electronic device uses electrical power. In particular, use of the device's positioning location hardware (e.g. global positioning system hardware) and processor consumes power. If a geofence radius is small relative to a speed at which the mobile electronic device is moving, then a mobile electronic device may provision many geofences successively. As a result, the mobile electronic device may experience undesirable battery power drain.

A technical solution to the technical problem of provisioning a proper geofence for an electronic device in motion, and decreasing the undesirable power drain on the battery caused by unnecessary provisioning of multiple geofences is presented herein. In particular, in one or more embodiments, a method is described for determining a radius of the geofence based on a combination of 1) an average speed limit of roads within a pre-determined number of turns of the electronic device, and 2) pre-determined tiered radii of proper geofences at different predicted average speeds. In other words, once a predicted average speed of the electronic device is determined, the predicted average speed is used to select one of the tiers. The geofence radius to be provisioned for the electronic device is set to the radius defined by the selected tier. By basing the geofence radius on the predicted speed of the mobile electronic device, a proper geofence radius can be established. In turn, the proper geofence radius reduces the total number of geofence provisioning operations that the mobile electronic device performs, thereby reducing the power drain on the device's battery.

Attention is now turned to the figures. FIG. 1 shows a computing system (100), in accordance with one or more embodiments of the invention. The computing system (100) may be a mobile device in one embodiment, such as a mobile phone. In other embodiments, the computing system (100) may be any other kind of electronic device, such as but not limited to a laptop computer, a tablet, etc., that is located in a mobile vehicle. In still other embodiments, the computing system (100) may be a desktop computer or some other type of computer.

The computing system (100) includes a data repository (102). In one or more embodiments of the invention, the data repository (102) is a storage unit and/or device (e.g., a file system, database, collection of tables, or other storage mechanism) for storing data. Further, the data repository (102) may include multiple different storage units and/or devices. The multiple different storage units and/or devices may or may not be of the same type and may or may not be located at the same physical site. However, if the computing system (100) is a mobile device such as a mobile phone, then the data repository (102) is physically located within the computing system (100). On the other hand, as explained further with respect to FIG. 2, the one or more embodiments contemplate a server-side computer determining the predictive geofence radius for the computing system (100). In such cases, the data repository (102) may be one or more physical or virtual memory systems remote from the mobile device.

The data repository (102) may store a variety of data. For example, the data repository (102) may store a first geofence (104). The first geofence (104) is a geofence, not yet provisioned, that has been requested to be provisioned for the computing system (100). The first geofence (104) is further distinguished from other types of geofences in that the first geofence (104) would be determined and provisioned by standard geofencing techniques, and not by the predictive techniques described with respect to FIG. 2. The first geofence (104) is used as a reference, in part, for showing the improved power savings of using the techniques described with respect to FIG. 2.

Generally, a geofence is a virtual perimeter for a real-world geographic area. The use of a geofence is called geofencing. Geofencing has a number of practical applications, such as triggering an electronic action responsive to a determination of the location of an object relative to the geofence. For example, if an object being tracked leaves a geofence, then an alert may be generated and transmitted to a user device. As used herein, the radius of a geofence is defined as the physical distance between a location of the computing system (100), as the center, to a corresponding real location that is co-located on the perimeter of the geofence.

In some embodiments, the radius of the geofence need not be uniform. In other words, while the shape of the geofence may be a perfect circle in some embodiments, in other embodiments the shape of the geofence may vary. In particular, the geofence may have a varying radius depending on where, along the perimeter of the geofence, the radius is measured.

The one or more embodiments, for clarity, refer to differently named geofences. While all of the different geofences and geofence radii are essentially the same in nature, the different geofences are provisioned at different times, or predicted to be provisioned at different times, and thus may vary in radius or when created.

Thus, for example, the first geofence (104) has a pre-determined first radius that would be provisioned. Based on the pre-determined radius, and on the speed at which the electronic device is moving over time, a first predicted duration of the first geofence (104) can be determined before a second predicted geofence (106) is provisioned. The second predicted geofence (106) is a geofence, not yet provisioned, that is predicted to be provisioned once the electronic device has exited the boundary of the first geofence (104). The second predicted geofence (106) has a second pre-determined radius. The timing of provisioning the second predicted geofence (106) is defined based on an actual speed of the mobile electronic device by determining when the device would exit the first geofence (104), thereby necessitating the provisioning of the second predicted geofence (106). Because the total power used by provisioning each of the first geofence (104) and the second predicted geofence (106) is known, the total power that would have been used to provision the first geofence (104) and the second predicted geofence (106) is also known. The total power of provisioning the first geofence (104) and the second predicted geofence (106) may be referred to as a first amount of power.

The data repository (102) also may store a map of roads (108). With the map of the roads (108), it is possible to determine which of the roads (108) are within a pre-determined number of turns (110) of the mobile electronic device. The turns (110) refer to one or more physical turns on the roads (108), such as when an automobile turns from one road onto another while driving. For example, the mobile electronic device may be initially located on Road 1 (112) and then turn onto Road 2 (114). Turning from Road 1 (112) to Road 2 (114) is defined as one turn. Subsequently turning from Road 2 (114) onto another road would be considered two turns.

In the case of traveling in an automobile on roads, most roads have a predefined speed limit A speed limit is a maximum legally allowed speed of travel, as defined by a recognized legal authority, such as a government or, more rarely, a private individual. The Road 1 (112) is associated with Speed Limit 1 (116), and the Road 2 (114) is associated with Speed Limit 2 (118). Thus, the applicable speed limits correspond to the roads (108) within the number of turns (110).

The data repository (102) may also store a predicted average speed (120). The predicted average speed (120) is the average of the speed limits of the roads (108) within the number of turns (110). In an embodiment, the predicted average speed (120) may also be weighted based on the length of the roads, and thus take into account the distance traveled at a given speed limit. In an embodiment, the predicted average speed (120) may also be weighted by current average speeds on a road based on prevailing traffic conditions. For example, if the current traffic conditions predict that the current practical speed limit on a road is half of the legal speed limit, then the lower speed may be used in determining the weighted predicted average speed (120). Other weight schemes for determining the predicted average speed (120) may be used, such as weather information, construction information, etc. Combinations of different weights also may be used.

The data repository (102) may also store a first predictive geofence (122) having a predictive geofence radius (124). The first predictive geofence (122) is a geofence predicted using the techniques described with respect to FIG. 2. The term "first" only has significance in terms of when the first predictive geofence (122) is generated relative to a second predictive geofence (126). Thus, the second predictive geofence (126) is generated after the first predictive geofence (122). The second predictive geofence (126) is also a geofence predicted, or which could be predicted, using the techniques described with respect to FIG. 2.

Similarly, the predictive geofence radius (124) is the radius of the first predictive geofence (122). The term "predictive" is used for identification or nomenclature purposes, as the predictive geofence radius (124) is selected based on a prediction of the proper size of the first predictive geofence (122).

The data repository (102) may also store a current position (128) of the mobile electronic device. The current position (128) is the position of the mobile electronic device in space and time, relative to the Earth or some other reference. Note that in some embodiments, the mobile electronic device is the computing system (100), and thus the current position (128) is the physical location of the computing system (100). However, in other embodiments, the computing system (100) is a server (130) that has been tasked with performing the method described with respect to FIG. 2. In this case, the current position (128) is the physical location of the mobile electronic device, not of the computing system (100). However, unless otherwise specified, it is assumed herein that the computing system (100) is the mobile electronic device.

The computing system (100) may have programs for using the information in the data repository (102). Thus, the programs may take the form of software stored in the data repository (102), or may take the form of hardware, such as application specific integrated circuits (ASICs).

The programs may include a geolocation application (132). When the mobile electronic device performs the techniques described with respect to FIG. 2, the geolocation application (132) is loaded on the mobile electronic device. The geolocation application (132) is configured to identify the current position of the mobile device using the geolocation hardware, as described with respect to FIG. 2. An example of a geolocation application (132) is a global positioning satellite (GPS) software system, though other types of geolocation applications are possible.

The programs also may include a map application (134). When the mobile electronic device performs the techniques described with respect to FIG. 2, the map application (134) is loaded on the mobile electronic device. The map application (134) is configured to identify the roads (108) and the corresponding speed limits (e.g., Speed Limit 1 (116) and Speed Limit 2 (118)), as described with respect to FIG. 2. An example of a map application (134) may be Google® Maps or Apple® Maps, though many other types of map applications exist.

The programs also may include a geofence provisioning application (136). When the mobile electronic device performs the techniques described with respect to FIG. 2, the geofence provisioning application (136) is loaded on the mobile electronic device. The geofence provisioning application (136) is configured, at a minimum, to provision the first predictive geofence (122) in response to a request to provision the first geofence (104), as described with respect to FIG. 2. Provisioning the first predictive geofence (122) saves electrical power relative to provisioning the first geofence (104), as described with respect to FIG. 2.

The computing system (100) may include other components, particularly when the computing system (100) is the mobile electronic device. Whether the computing system (100) is the mobile electronic device or the server (130), the computing system (100) includes a processor (138). The processor (138) is a computer processor, such as that described with respect to FIG. 6A and FIG. 6B. the processor (138) may execute the method described with respect to FIG. 2.

The computing system (100) may also include a battery (140), which stores a finite amount of electrical power. If the computing system (100) is the mobile electronic device, then it is assumed that the battery (140) is part of the computing system (100). The battery (140) provides power to computing system (100), and provides the power needed to operate the processor (138) to perform the method of FIG. 2. In the case of the mobile electronic device, the battery (140) also provides the power used for provisioning any geofences.

The computing system (100) may also include geolocation hardware (142), particularly when the computing system (100) is the mobile electronic device. The geolocation hardware (142) provides the capability of determining the location of the mobile electronic device with respect to a reference system, such as the GPS system, a map of Earth, etc. The geolocation hardware (142) may be one or more components, such as electronics for receiving signals from the GPS system, one or more accelerometers, etc. In some embodiments the geolocation hardware (142) could be replaced by software for processing signals from other hardware, possibly remote hardware, that determines the physical location of the mobile electronic device.

While FIG. 1 shows a configuration of components, other configurations may be used without departing from the scope of the invention. For example, various components may be combined to create a single component. As another example, the functionality performed by a single component may be performed by two or more components.

Figure 2:
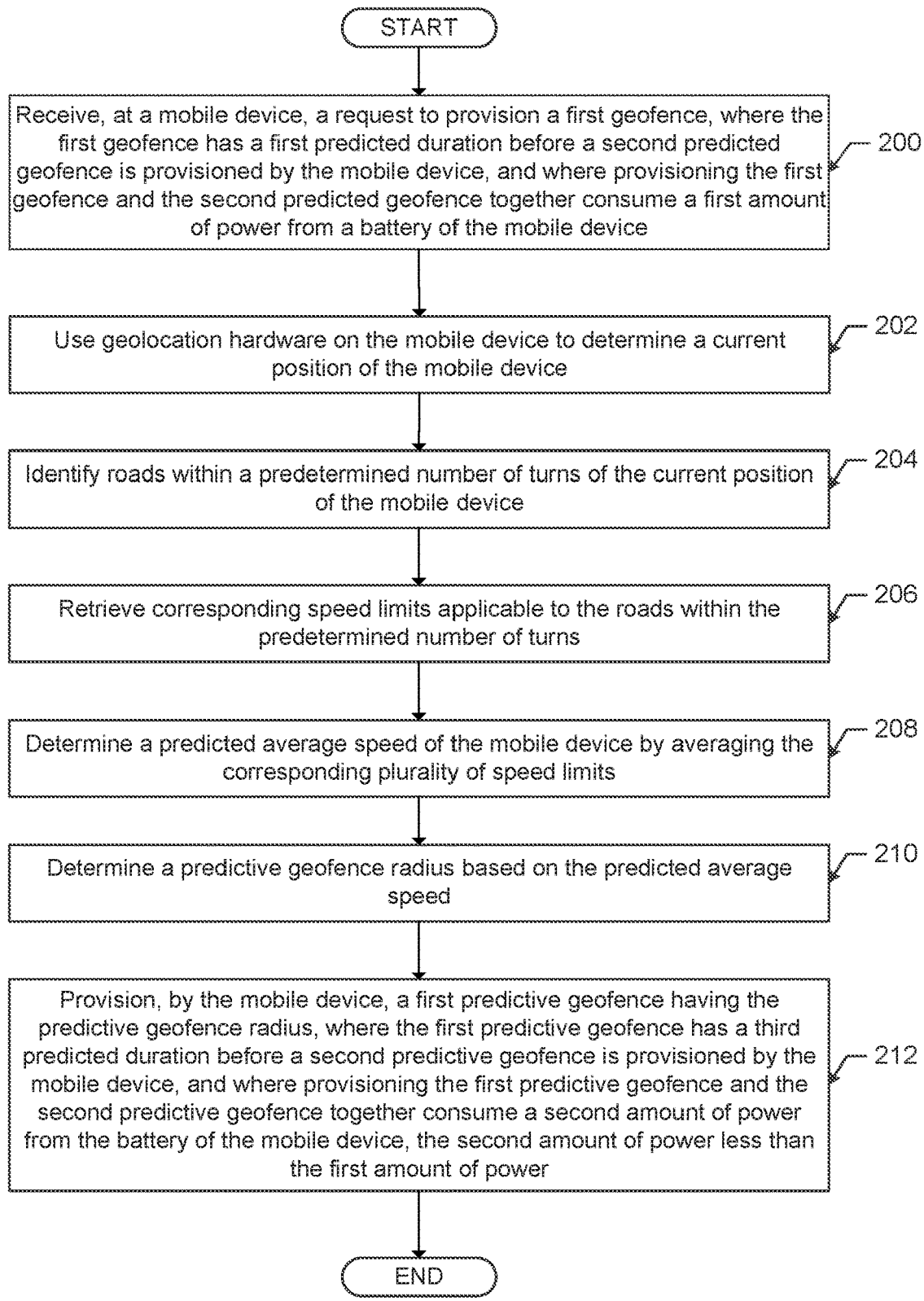
FIG. 2 shows a flowchart of a method for provisioning a geofence, in accordance with one or more embodiments of the invention.

FIG. 2 is a flowchart of a method for provisioning a geofence, in accordance with one or more embodiments. The method of FIG. 2 may be implemented using the computing system (100) shown in FIG. 1, or using the computing system and network shown in FIG. 6A and FIG. 6B. The method of FIG. 2 may be characterized as a method for reducing mobile device power consumption through predictive speed-based geofence location tracking. The method of FIG. 2 is performed by the mobile device that is moving. Note, however, a different embodiment (i.e., other than FIG. 2) is contemplated where the determination of the predictive geofence radius is performed server-side and then transmitted to the mobile device for provisioning.

At step (200), a request is received, at a mobile device, to provision a first geofence. The first geofence has a first predicted duration before a second predicted geofence is provisioned by the mobile device. Provisioning the first geofence and the second predicted geofence together are predicted to consume a first amount of power from a battery of the mobile device. Note that the first geofence and the second predicted geofence have not been provisioned, but rather are considered in order to show how the method of FIG. 2 draws less power from the battery than a traditional method of provisioning fixed pre-pre-determined geofences, such as the first geofence and the second predicted geofence.

Note that the multiple geofences are provisioned sequentially not concurrently in the one or more embodiments.

Nevertheless, the mobile device has received a request to provision a geofence. Thus, the method for provisioning the geofence continues, as described further below.

At step (202) geolocation hardware on the mobile device is used to determine a current position of the mobile device. The geolocation hardware may be used by geolocation software receiving and processing readings from an accelerometer, a communication device in communication with a satellite system (e.g., the GPS system), etc. Alternatively, the hardware itself may directly process information and determine the current position of the mobile device. The current position may be reported with respect to a convenient reference system, such as latitude and longitude, position on a map, etc.

At step (204), the mobile device identifies roads within a predetermined number of turns of the current position of the mobile device. For example, if the mobile device is on road A, and within two turns the mobile device may be on any of road B through road F, then all of road A through road F are identified if the pre-determined number of turns is "two."

At step (206), the mobile device retrieves corresponding speed limits applicable to the roads within the predetermined number of turns. The mobile device may retrieve the corresponding speed limits from map information associated with the roads. Alternatively, the mobile device may retrieve information about roads and corresponding speed limits from an application programming interface (API) that interfaces with some other software such as a web browser. Continuing the example, road A through road F each has an speed limit associated. Road A through road D have a speed limit of 25 miles per hour (MPH), road E has a speed limit of 55 MPH, and road F has a speed limit of 70 MPH. These speed limits are retrieved from the mapping program or some other data source.

At step (208), the mobile device determines a predicted average speed of the mobile device by averaging the corresponding speed limits Thus, continuing the example, the predicted average speed is the average speed limit of road A through road F. Specifically, the predicted average speed is (25+25+25+25+55+70)/6=37.5 MPH.

At step (210) the mobile device determines a predictive geofence radius based on the predicted average speed. For example, the predicted average speed may be crossed referenced to a corresponding pre-determined geofence radius on a table. A specific example of the predictive geofence radius being "based on" the predicted average speed using a table is shown in FIG. 3 through FIG. 5. However, the predictive geofence radius may be "based on" the predicted average speed using other methods. For example, a mathematical formula may be used to calculate the geofence radius, taking the predicted average speed. In a particular example, the geofence radius could be 200 meters plus 100 meters for every 15 MPH increment in predicted average speed above 20 MPH. In another example, the geofence radius could be a number of meters equal to the predicted average speed times ten. Other methods may be used to determine the predictive geofence radius "based on" the predicted average speed.

At step (212) the mobile device provisions a first predictive geofence having the predictive geofence radius. The first predictive geofence has a third predicted duration before a second predictive geofence is provisioned by the mobile device. Provisioning the first predictive geofence and the second predictive geofence together consume a second amount of power from the battery of the mobile device, the second amount of power less than the first amount of power. In other words, the power savings accomplished by provisioning the geofence according to steps 202 through 210 is quantifiably ascertainable by predicting how much power would have been used had traditional geofence provisioning rules been used, compared to a prediction of how power would have been used had the inventive provisioning technique been used under similar circumstances. Specifically, the one or more embodiments will provision fewer geofences than the older provisioning techniques, because the geofences provisioned under the one or more embodiments are "proper" (as defined above), whereas the older provisioning techniques do not properly take into account the speed of the mobile device.

The one or more embodiments described with respect to FIG. 2 may be varied. For example, the predictive geofence radius may be determined by comparing the predicted average speed to tiers of speeds; selecting a selected tier from the tiers, wherein the predicted average speed is in the selected tier; and setting the predictive geofence radius to a pre-determined distance associated with the selected tier. An example of the procedure is shown in FIG. 3 through FIG. 5.

In another embodiment, after provisioning the first predictive geofence, the geolocation hardware may be used a second time to determine a second current position of the mobile device. In this case, responsive to the second current position being outside the first predictive geofence radius, a geofence exit is called. A geofence exit means that the mobile electronic device is deemed to be outside the geofence, and the geofence will be deleted or unprovisioned. Optionally, a new geofence may then be provisioned.

For example, assume the predictive geofence radius is a first predictive geofence radius. In this case, after calling the geofence exit, second roads are identified within a second predetermined number of turns of the second current position of the mobile device. Second corresponding speed limits applicable to the second roads are retrieved. A second predicted average speed of the mobile device is determined by averaging the second corresponding speed limits. A second predictive geofence radius is determined based on the predicted average speed. The second predictive geofence radius is larger than the first predictive geofence radius, because in this example the mobile electronic device is moving faster than previously predicted. The second predictive geofence having the second predictive geofence radius is then provisioned.

In another variation, after determining the predictive geofence radius but prior to provisioning the first predictive geofence, the geolocation hardware is used a second time to determine a second current position of the mobile device. Then, responsive to the second current position being within the predictive geofence radius, the step of provisioning the first predictive geofence is performed.

In an embodiment, at least one location of the mobile device may be recorded within the first predictive geofence. The at least one location may be reported to a time sheet program. The time sheet program may record the location of the mobile electronic device to track an employee's location and to aid in automatically generating a billing invoice for the business for which the employee works.

In still another example, identifying the roads and retrieving the corresponding speed limits may be performed by retrieving map data from a map program logically distinct from one or more software programs that perform the other steps of the one or more embodiments. For example, one or more other logically distinct software programs determine the predicted average speed, determine the predictive geofence radius, provision the first predictive geofence, etc.

In yet another embodiment, determining the predictive geofence radius based on the predicted average speed may be modified by weighting the speed limits. For example, the predicted average speed may be adjusted based on prevailing traffic conditions. The predicted average speed may be adjusted based on a direction of travel. The predicted average speed may be adjusted by adjusting the pre-determined number of turns according to at least one of a measured speed of the mobile device and prevailing traffic conditions. Many other different conditions or settings may be taken into account when determining the predicted average speed before using the predicted average speed to determine the predictive geofence radius.

While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention. Thus, the one or more embodiments are not necessarily limited to the examples described herein.

FIG. 3 through FIG. 5 present a specific example of the techniques described above with respect to FIG. 1 and FIG. 2. The following example is for illustrative purposes only and not intended to limit the scope of the invention.

FIG. 3 shows a process of determining an average predicted speed of the electronic device for purposes of determining which tier should be selected when provisioning a geofence for the electronic device. In FIG. 3, it is assumed that the mode of travel is via automobile. In FIG. 3, a map application is called to determine all roads within one turn of the current position (300) of the electronic mobile device (represented as the central dot in FIG. 3).

Note that the number of turns used could have been increased depending on the location of the electronic device. For example, had the electronic device been located in a dense city, then more turns may have been appropriate.

In the example of FIG. 3, three roads exist within one turn of the electronic device. Specifically, the electronic device is on road A (302), but road B (304), and road C (306) are both within one turn of the current position of the electronic device.

A calculation is then made of the average speed limit of the three roads within one turn of the current position electronic device. The speed limit of Road A (302) is 55 mph (miles per hour), the speed limit of road B (304) is 50 mph, and the speed limit of road C (306) is 35 mph. The average of these speed limits is (55+50+35)/3=47 mph, approximately.

FIG. 4 shows the radii of differently tiered geofences, in accordance with one or more embodiments. In this example, the tiers are expressed as follows:

| Tier | Speed | Geofence Radius |
| --- | --- | --- |
| 1 | 0-20 mph | 150 meters |
| 2 | 21-35 mph | 250 meters |
| 3 | 36-50 mph | 350 meters |
| 4 | 51-70 mph | 500 meters |
| 5 | 71 mph and higher | 600 meters |

Thus, for example, at tier 1 (400), the geofence radius is 150 meters. Similarly, at tier 3 (402) the geofence radius is 350 meters, and at tier 4 (404) the geofence radius is 500 meters. Tier 2 and tier 5 are not shown for purposes of clarity.

FIG. 5 shows the electronic device (500) provisioned with a geofence (502) of selected radius "R" (504). The electronic device (500) is the electronic device shown in FIG. 3. Because the average speed limit of the roads within one turn of the current position of the electronic device (500) is approximately 47 mph, tier 3 is selected. Thus, the selected radius "R" (504) for the geofence (502) will be set to 350 meters, per the pre-determined chart shown above with respect to FIG. 4.

Prior to actually provisioning the geofence accordingly, the current location of the electronic device (500) is again checked. If the electronic device (500) has already left the planned radius of the geofence, then the geofence is not provisioned.

Optionally, if the geofence is not provisioned, the process may be repeated, perhaps using a different number of turns. For example, an increased number of turns may be used when predicting the predicted speed of the electronic device (500). The increase in the number of turns results in averaging more speed limits for more roads, as shown on the map application, thereby possibly increasing an accuracy of the prediction. Alternatively, the number of turns may be decreased, such as in the case where the electronic device (500) is shown as traveling on a lightly-congested freeway through a city with many turns. In this case, the predicted speed of the electronic device (500) will increase since no turns are taken into account (i.e., it is predicted that the electronic device (500) will stay on the freeway and remain at a high rate of speed). In an alternative, a speed of the electronic device (500) may be determined directly using global positioning and/or map software, in conjunction with past locations of the electronic device (500), to predict the speed of the electronic device (500).

In still another alternative, a planned destination programmed into the map device may be used to compute the average speed of the electronic device (500) along different portions of the planned route to the planned destination. As a result, geofences of different radii may be provisioned at different stages of the journey where different speed limits are expected. The one or more embodiments are not limited to the specific examples described above.

As indicated above, the one or more embodiments provide for provisioning on an electronic device a geofence having a radius that varies according to a predicted average speed of the electronic device. If the electronic device is predicted to travel at higher speeds, the radius of the geofence is higher. If the electronic device is predicted to travel at lower speeds, the radius of the geofence is lower. Accordingly, a proper geofence radius is more likely to be set for the electronic device using the techniques of the one or more embodiments.

Figure 6A:
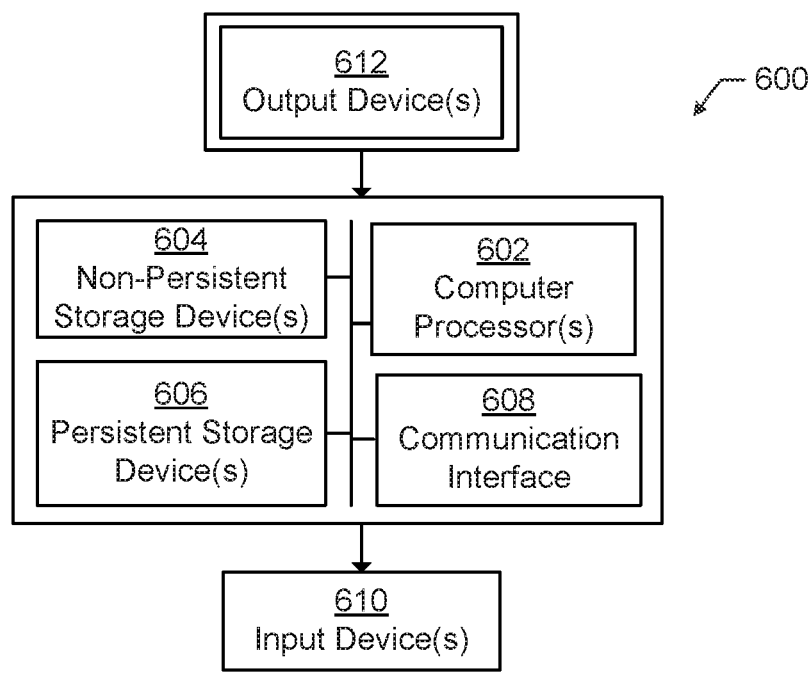
FIG. 6A and FIG. 6B show a computing device and a network environment, in accordance with one or more embodiments of the invention.
Figure 6B:
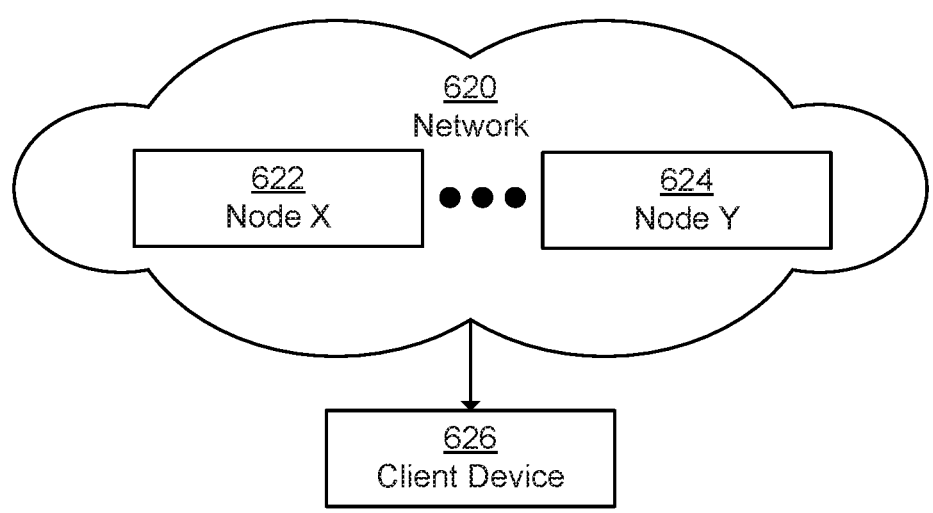

FIG. 6A and FIG. 6B are examples of a computing system and a network, in accordance with one or more embodiments of the invention. Embodiments of the invention may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 6A, the computing system (600) may include one or more computer processors (602), non-persistent storage device(s) (604) (e.g., volatile memory, such as random access memory (RAM), cache memory), persistent storage device(s) (606) (e.g., a hard disk, an optical drive such as a compact disk (CD) drive or digital versatile disk (DVD) drive, a flash memory, etc.), a communication interface (608) (e.g., Bluetooth interface, infrared interface, network interface, optical interface, etc.), and numerous other elements and functionalities that implement the features and elements of the disclosure.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (608) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (612), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage device(s) (604), and persistent storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system shown in FIG. 6A, or a group of nodes combined may correspond to the computing system shown in FIG. 6A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (600) may be located at a remote location and connected to the other elements over a network.

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6A. Further, the client device (626) may include and/or perform all or a portion of one or more embodiments of the invention.

The computing system or group of computing systems described in FIGS. 6A and 6B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 6A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 6A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A—B), and the status flags may be read to determine if the result is positive (i.e., if A>B, then A—B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 6A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (database, table, record, column, view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 6A and the nodes and/or client device in FIG. 6B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   receiving, at a mobile device, a request to provision a first geofence,
      wherein the first geofence has a first predicted duration before a second predicted geofence is provisioned by the mobile device, and
      wherein provisioning the first geofence and the second predicted geofence together consume a first amount of power from a battery of the mobile device;
   using geolocation hardware on the mobile device to determine a current position of the mobile device;
   identifying, by the mobile device, a plurality of roads within a predetermined number of turns of the current position of the mobile device;
   retrieving, by the mobile device, a corresponding plurality of speed limits applicable to the plurality of roads within the predetermined number of turns;
   determining, by the mobile device, a predicted average speed of the mobile device by averaging the corresponding plurality of speed limits;
   determining, by the mobile device, a predictive geofence radius based on the predicted average speed; and
   provisioning, by the mobile device, a first predictive geofence having the predictive geofence radius,
      wherein the first predictive geofence has a third predicted duration before a second predictive geofence is provisioned by the mobile device, and
      wherein provisioning the first predictive geofence and the second predictive geofence together consume a second amount of power from the battery of the mobile device, the second amount of power less than the first amount of power.

2. The method of claim 1, wherein determining the predictive geofence radius based on the predicted average speed further comprises:
   comparing the predicted average speed to a plurality of tiers of speeds,
   selecting a selected tier from the plurality of tiers, wherein the predicted average speed is in the selected tier, and
   setting the predictive geofence radius to a pre-determined distance associated with the selected tier.

3. The method of claim 1, further comprising:
   after provisioning the first predictive geofence, using the geolocation hardware a second time to determine a second current position of the mobile device; and
   responsive to the second current position being outside the predictive geofence radius, calling a geofence exit.

4. The method of claim 3, wherein the predictive geofence radius is a first predictive geofence radius, and wherein the method further comprises:
   after calling the geofence exit, identifying a second plurality of roads within a second predetermined number of turns of the second current position of the mobile device,
   retrieving a second corresponding plurality of speed limits applicable to the second plurality of roads,
   determining a second predicted average speed of the mobile device by averaging the second corresponding plurality of speed limits,
   determining a second predictive geofence radius based on the predicted average speed, the second predictive geofence radius larger than the first predictive geofence radius, and
   provisioning, on the mobile device, the second predictive geofence having the second predictive geofence radius.

5. The method of claim 1, further comprising:
   after determining the predictive geofence radius but prior to provisioning the first predictive geofence, using the geolocation hardware a second time to determine a second current position of the mobile device; and
   responsive to the second current position being within the predictive geofence radius, performing the step of provisioning the first predictive geofence.

6. The method of claim 1, further comprising:
   recording at least one location of the mobile device within the first predictive geofence; and
   reporting the at least one location to a time sheet program.

7. The method of claim 1, wherein identifying the plurality of roads and retrieving the corresponding plurality of speed limits are performed by retrieving map data from a map program logically distinct from one or more software programs that:
   determine the predicted average speed,
   determine the predictive geofence radius, and
   provision the first predictive geofence.

8. The method of claim 1, wherein determining the predictive geofence radius based on the predicted average speed further comprises:
   adjusting the predicted average speed based on prevailing traffic conditions.

9. The method of claim 1, wherein determining the predictive geofence radius based on the predicted average speed further comprises:
   adjusting the predicted average speed based on a direction of travel.

10. The method of claim 1, wherein determining the predictive geofence radius based on the predicted average speed further comprises:
    adjusting the predetermined number of turns based on at least one of a measured speed of the mobile device and prevailing traffic conditions.

11. A system comprising:
    a mobile device comprising a processor, communications hardware, geolocation hardware, a battery, and a data repository, wherein the data repository stores:
       a request to provision a first geofence,
          wherein the first geofence has a first predicted duration before a second predicted geofence is provisioned by the mobile device, and
          wherein provisioning the first geofence and the second predicted geofence together consume a first amount of power from a battery of the mobile device a current position of the mobile device,
       a plurality of roads within a predetermined number of turns of the current position of the mobile device,
       a corresponding plurality of speed limits applicable to the plurality of roads within the predetermined number of turns,
       a predicted average speed of the mobile device, and
       a first predictive geofence having a predictive geofence radius;
    a geolocation application loaded on the mobile device configured to identify the current position of the mobile device using the geolocation hardware;
    a map application loaded on the mobile device configured to identify the plurality of roads and the corresponding plurality of speed limits;
    a geofence provisioning application configured to save current drawn from the battery to power the geolocation hardware by being programmed to, responsive to receiving the request to provision the first geofence:
   determine the predicted average speed by averaging the corresponding plurality of speed limits,
   determine the predictive geofence radius based on the predicted average speed, and
   provision the first predictive geofence with the predictive geofence radius on the mobile device,
      wherein the first predictive geofence has a third predicted duration before a second predictive geofence is provisioned by the mobile device, and
      wherein provisioning the first predictive geofence and the second predictive geofence together consume a second amount of power from the battery of the mobile device, the second amount of power less than the first amount of power.

12. The system of claim 11, wherein the geofence provisioning application is further configured to set the predetermined number of turns.

13. The system of claim 11, wherein the geofence provisioning application is further configured to determine the predictive geofence radius based on the predicted average speed further by being configured to:
   compare the predicted average speed to a plurality of tiers of speeds, and
   select a selected tier from the plurality of tiers, wherein the predicted average speed is in the selected tier, and
   set the predictive geofence radius to a pre-determined distance associated with the selected tier.

14. The system of claim 11, wherein the geofence provisioning application is further configured to:
   after provisioning the first predictive geofence, use the geolocation hardware a second time to determine a second current position of the mobile device, and
   responsive to the second current position being outside the predictive geofence radius, call a geofence exit.

15. The system of claim 14,
   wherein the predictive geofence radius is a first predictive geofence radius, and
   wherein the geofence provisioning application is further configured to:
      after calling the geofence exit, identify a second plurality of roads within a second predetermined number of turns of the second current position of the mobile device,
      retrieve a second corresponding plurality of speed limits applicable to the second plurality of roads,
      determine a second predicted average speed of the mobile device by averaging the second corresponding plurality of speed limits,
      determine a second predictive geofence radius based on the predicted average speed, the second predictive geofence radius larger than the first predictive geofence radius, and
      provision, on the mobile device, a second predictive geofence having the second predictive geofence radius.

16. The system of claim 11, wherein the geofence provisioning application is further configured to:
   after determining the predictive geofence radius but prior to provisioning the first predictive geofence, use the geolocation hardware a second time to determine a second current position of the mobile device, and
   responsive to the second current position being within the predictive geofence radius, perform the step of provisioning the first predictive geofence.

17. The system of claim 11, wherein the geofence provisioning application is further configured to:
   record at least one location of the mobile device within the first predictive geofence, and
   report the at least one location to a time sheet program.

18. The system of claim 11, wherein the geofence provisioning application is further configured to determining the predictive geofence radius based on the predicted average speed further by being further configured to perform at least one of:
   adjusting the predicted average speed based on prevailing traffic conditions,
   adjusting the predicted average speed based on a direction of travel, and
   adjusting the predetermined number of turns based on at least one of a measured speed of the mobile device and prevailing traffic conditions.

* * * * *

UNITED STATES PATENT AND TRADEMARK OFFICE
CERTIFICATE OF CORRECTION

PATENT NO. : 11,166,232 B1  
APPLICATION NO. : 17/029328  
DATED : November 2, 2021  
INVENTOR(S) : Nathan A. McIntyre et al.

Page 1 of 1

It is certified that error appears in the above-identified patent and that said Letters Patent is hereby corrected as shown below:

In the Claims

Column 18, Claim 11, Line 51, "...a battery of the mobile device a current position of the mobile device." should read -- ... a battery of the mobile device;
a current position of the mobile device determined using geolocation hardware on the mobile device. --.

Signed and Sealed this  
Fifteenth Day of March, 2022

Drew Hirshfeld  
*Performing the Functions and Duties of the*  
*Under Secretary of Commerce for Intellectual Property and*  
*Director of the United States Patent and Trademark Office*